UNITED STATES PATENT OFFICE.

CHARLES DELAYGUE, OF PARIS, FRANCE.

AMMONIA-DISSOLVING COMPOSITION FOR USE IN REFRIGERATION APPARATUS.

1,345,144.  Specification of Letters Patent.  Patented June 29, 1920.

No Drawing. Original application filed February 27, 1914, Serial No. 821,428. Divided and this application filed February 16, 1920. Serial No. 359,043.

*To all whom it may concern:*

Be it known that I, CHARLES DELAYGUE, a citizen of the French Republic, residing in Paris, France, have invented a new and Improved Ammonia-Dissolving Composition for Use in Refrigeration Apparatus, of which the following is a full, clear, and exact description.

This is a divisional application which has been carved from my original application filed Feb. 27, 1914, Serial No. 821,428, and allowed October 30, 1919.

This invention relates to refrigerating compositions, and has reference more particularly to a composition of the class described containing water, ammonium nitrate, trimethylamin, and ammonia.

An object of this invention is to provide a refrigerating composition which will dissolve large quantities of ammonia under high pressure with a resulting small volume.

Another object of this invention is to provide a refrigerating composition which may be freed of ammonia by heating without giving off other volatile substances which would interfere with the refrigeration process.

A further object of this invention is to provide a refrigerating composition which will easily reabsorb ammonia gas when said composition is cooled.

It is desirable in a refrigerating apparatus such as the one mentioned in the aforementioned application, to have a refrigerating medium which will absorb large quantities of ammonia gas and will give off said gas when said composition is heated without also giving off any volatile substances which would interfere with the refrigerating process. If any volatile substances were given off, they would mix with the ammonia gas and would condense in the refrigerating appartus subsequently delaying the spontaneous evaporation of the liquid ammonia in said refrigerating apparatus.

These conditions are fulfilled by the following composition, having a specific gravity of 0.847:

Ammonium nitrate _____ 3 grams
Trimethylamin _____ 2 grams
Liquid ammonia _____ 554 cubic centimeters
Water _____ Sufficient to make one liter The solubility of the ammonium nitrate in water is enormously increased by the presence of trimethylamin. The presence of the ammonium nitrate lowers the vapor pressure of the solution and raises its boiling point so that it is sufficient to warm the solution to a temperature 120° C. above the temperature in the refrigerator described in my aforementioned application in order to completely expel all the ammonia from the generator-absorber described in said application with a subsequent condensation of said ammonia in the refrigerator. The small amount of water that might evaporate during the expulsion of the ammonia from the generator absorber condenses easily in the eduction tube and returns to the generator absorber without reaching the refrigerator.

This refrigerating composition when once placed in the apparatus is inexhaustible and does not change, but always conserves its activity if the apparatus is kept tightly closed.

Having thus described my invention, I claim as new and desire to secure by Letters Patent:

1. A refrigerating composition which consists of an ammonium salt, trimethylamin, ammonia, and water.

2. A refrigerating composition which consists in ammonium nitrate, trimethylamin, ammonia, and water.

3. A refrigerating composition which consists in ammonium nitrate three grams, trimethylamin two grams, liquefied ammonia gas five hundred fifty four cubic centimeters, water sufficient to make volume of composition one liter.

CHARLES DELAYGUE.